April 4, 1939.  L. BROADMAN  2,153,168
TAKE-UP DEVICE FOR AUTOMOBILE WHEEL SUPPORTING STRUCTURES
Filed May 20, 1937
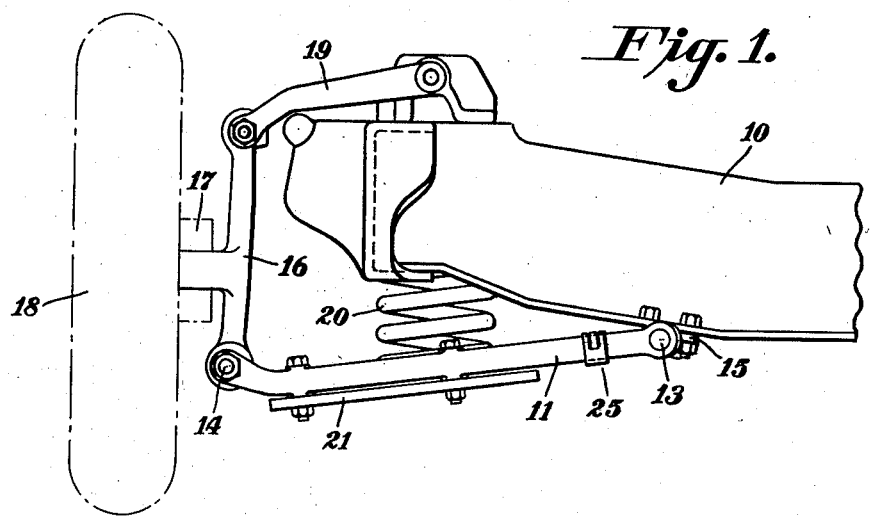
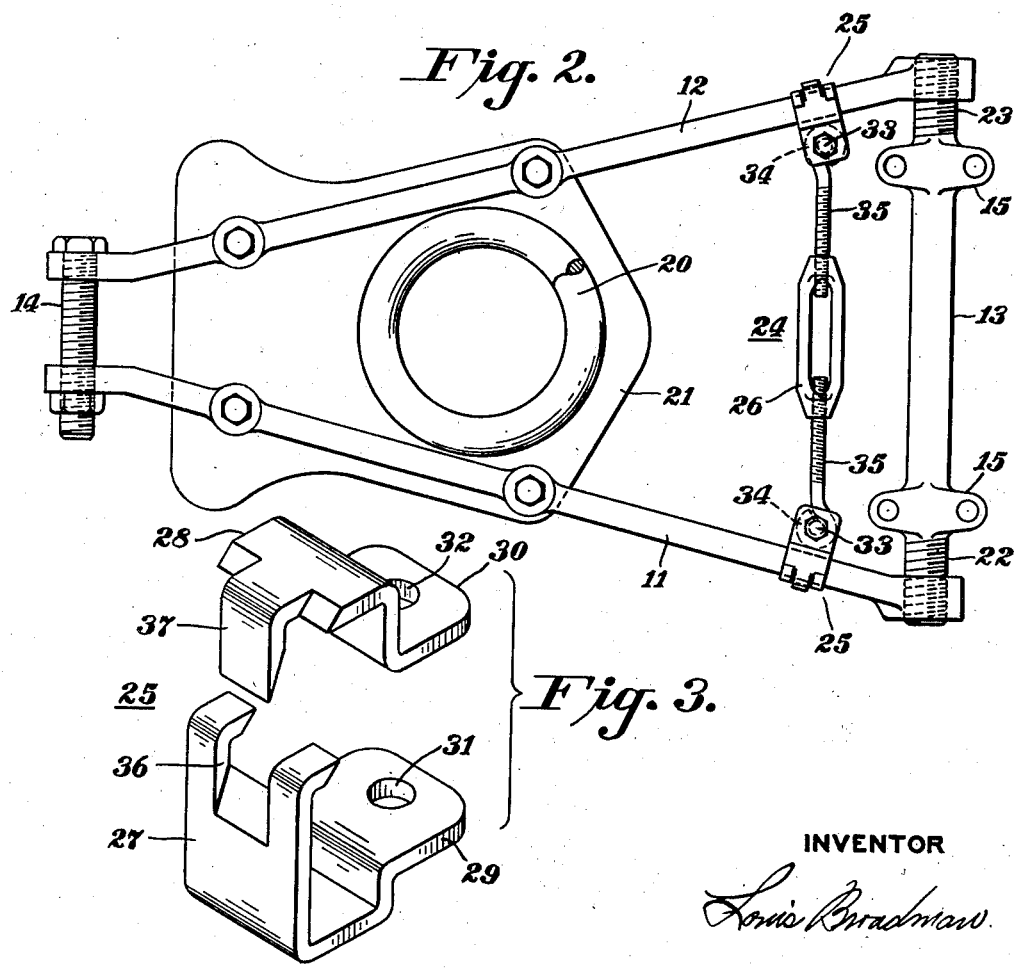
INVENTOR
Louis Broadman

UNITED STATES PATENT OFFICE 2,153,168

TAKE-UP DEVICE FOR AUTOMOBILE WHEEL SUPPORTING STRUCTURES

Louis Broadman, East Cleveland, Ohio

Application May 20, 1937, Serial No. 143,674

2 Claims. (Cl. 267—20)

My invention relates generally to automotive vehicles and more particularly to an improvement in front wheel systems therefor of the individually suspended or so-called "knee-action" type.

The individual type of front wheel suspension in use at the present time on many vehicles has the disadvantage of developing an objectionable thumping noise which may be caused by wearing of certain parts of the system or a loose original fitting of the said parts. The thumping noise manifests itself when the vehicle is brought to a stop by application of the brakes which causes the front of the vehicle to first settle down and then rise again after the vehicle has stopped. In severe cases the noise is also noticeable upon making a turn and is caused by the rolling or swaying of the vehicle.

One of the objects of my invention is to provide means for eliminating the above-mentioned noises in front wheel sytsems of the individually suspended type. Another object is to provide a novel type of take-up device for eliminating looseness or play in the portion of the front wheel system causing the said noise. Further objects and advantages of my invention will appear from the following description of a species thereof and from the drawing.

In the drawing, Fig. 1 is a front elevation of an individual front wheel suspension system and associated structure; Fig. 2 is a plan view of a supporting frame portion of the system showing a take-up device incorporated therein in accordance with my invention; and Fig. 3 is a perspective view of a two-piece clamp constituting a part of the take-up device.

Referring to the drawing, the front cross member 10 of the chassis of an automobile carries at its lower side a wheel supporting frame consisting of a pair of lower control arms 11—12, an inner pivot pin 13 and an outer pivot pin 14. The said pivot pin 13 is bolted, through flanges 15—15 thereon, to the underside of the crossmember 10. The outer pivot pin 14 is threaded in the tapped outer ends of the control arms 11—12 and carries one end of a support arm 16 which in turn supports the spindle body 17 of the front wheel 18 as well as the shock absorber arm 19. The said frame 11, 12, 13, 14 also supports the "knee action" coil spring 20 through a saddle 21 which is bolted to the control arms 11 and 12. The said control arms 11 and 12 therefore support practically the entire weight of the front system of the vehicle.

The pivot pin 13 is a hardened metal rod and is threaded at its ends 22 and 23. The ends of the control arms 11 and 12 are tapped and are threaded on to the said ends 22 and 23 respectively of the pivot pin 13 so as to pivot about the said pin 13 in a vertical direction. The tapped outer ends of said control arms also pivot about the outer pivot pin 14 so that they move upon each change in road contour or upon movement of the weight of the vehicle due to an application of the brakes or to rolling of the vehicle on turns. Since the lower control arms 11 and 12 are first hardened and then drilled and tapped with threads conforming to the threads on the pivot pins, they are subject to wear at the said threaded portions. This wear, or an original loose fit, results in the objectionable thumping noise. Heretofore, new parts were installed in order to restore the original tight fit, thereby entailing the expense of new parts as well as a considerable amount of labor in replacing the said parts.

According to my invention, the said noises are eliminated without the necessity of replacing the frame 11, 12, 13, 14, by employing a take-up device indicated generally at 24, by means of which pressure may be applied upon the inner ends of the control arms 11 and 12 to tighten them upon the threaded ends 22 and 23 of the inner pivot pin 13. The threads 22 and 23 are in the same direction, that is, both may be right hand threads. The take-up device shown in the drawing comprises a pair of two-piece clamps 25—25 shaped to fit around the control arms 11 and 12 and connected by a turnbuckle device 26. Each of the clamps 25 consists of two sections 27 and 28 (Fig. 3) having outwardly extending lip portions 29 and 30 which have holes 31 and 32 therein adapted to receive a bolt 33 for fastening them to opposite sides of the looped end or eye portion 34 of a threaded rod or bolt 35 of the turnbuckle device 26. One of said rods 35 has a right hand thread and the other a left hand thread. The section 27 of the clamp 25 is slotted at 36 to receive the tongue portion 37 of the section 28 to lock the two sections together.

When the threaded bearing surfaces formed by the ends 22—23 of the pin 13 and the tapped inner ends of the control arms 11—12 have become worn, it is merely necessary to install the take-up device 24, by placing the sections 27—28 of the clamps 25 on the ends of the said control arms 11—12, and then turn the turnbuckle 26 to pull the ends of said control arms toward each other and thereby tighten them upon the said pivot pin threads.

The take-up device 24 when used in the manner described does not in any way affect the flexibility of the action of the lower control arms 11—12, nor does it affect the camber, castor, toe-in or front wheel alignment of the vehicle or the steering ability of the vehicle. It also will not weaken any portion of the vehicle but will in fact strengthen the system. In case of further wear, it is merely necessary to adjust the turnbuckle 26 in order to again restore a tight fit.

Although I have shown and described a particular species of my take-up device, it will be apparent to those skilled in the art that various changes and modifications may be made without departing from the spirit of my invention.

What I claim as new and desire to secure by Letters Patent of the United States is:

1. In an automobile front wheel system of the individually suspended type, the combination of a supporting frame comprising a pivot pin threaded at its ends and a pair of control arms with tapped inner ends threaded on the ends of said pivot pin so as to pivot thereon, and a take-up device comprising a clamp on each of said control arms adjacent to the inner end thereof, and means connecting said clamps for pulling said inner ends of said control arms toward each other to maintain a tight fit between the threads on said pin and control arms.

2. In an automobile front wheel system of the individually suspended type, the combination of a supporting frame comprising a pivot pin threaded at its ends and a pair of control arms with tapped inner ends threaded on the ends of said pivot pin so as to pivot thereon, and a take-up device comprising a clamp on each of said control arms adjacent to the inner end thereof, and a turnbuckle device connecting said clamps for pulling said inner ends of said control arms toward each other to maintain a tight fit between the threads on said pin and control arms.

LOUIS BROADMAN.